United States Patent [19]

Stuckey

[11] Patent Number: 5,721,938
[45] Date of Patent: Feb. 24, 1998

[54] METHOD AND DEVICE FOR PARSING AND ANALYZING NATURAL LANGUAGE SENTENCES AND TEXT

[76] Inventor: Barbara K. Stuckey, 1836 N. Powhatan St., Arlington, Va. 22205

[21] Appl. No.: 487,263

[22] Filed: Jun. 7, 1995

[51] Int. Cl.⁶ .................................................. G06F 15/38
[52] U.S. Cl. .......................................... 395/754; 395/752
[58] Field of Search .................................. 395/752, 754, 395/755, 758, 759

[56] References Cited

U.S. PATENT DOCUMENTS

| | | |
|---|---|---|
| 4,641,264 | 2/1987 | Nitta et al. . |
| 4,731,021 | 3/1988 | Chan . |
| 4,773,009 | 9/1988 | Kucera et al. . |
| 4,864,502 | 9/1989 | Kucera et al. . |
| 4,887,212 | 12/1989 | Zamora et al. . |
| 4,907,971 | 3/1990 | Tucker . |
| 5,029,085 | 7/1991 | Ito . |
| 5,056,021 | 10/1991 | Ausborn . |
| 5,060,155 | 10/1991 | van Zuijlen . |
| 5,099,425 | 3/1992 | Yuji et al. . |
| 5,101,349 | 3/1992 | Tokuume et al. . |
| 5,113,342 | 5/1992 | Zamora . |
| 5,146,405 | 9/1992 | Church . |
| 5,146,406 | 9/1992 | Jensen . |
| 5,225,991 | 7/1993 | Yokogawa ........................ 395/752 |
| 5,237,502 | 8/1993 | White et al. . |
| 5,265,065 | 11/1993 | Turtle . |
| 5,297,040 | 3/1994 | Hu . |
| 5,299,124 | 3/1994 | Fukumochi ........................ 395/752 |
| 5,317,510 | 5/1994 | Yoshimura et al. . |
| 5,321,607 | 6/1994 | Fukumochi et al. . |
| 5,331,556 | 7/1994 | Black, Jr. et al. . |
| 5,337,232 | 8/1994 | Sakai et al. . |
| 5,338,976 | 8/1994 | Anwyl ........................ 395/752 |
| 5,559,693 | 9/1996 | Anick ........................ 395/752 |

*Primary Examiner*—Jeffery Hofsass
*Assistant Examiner*—Albert K. Wong
*Attorney, Agent, or Firm*—Kenyon & Kenyon

[57] ABSTRACT

A program is provided for organizing a natural language, such as English, into binary units of two basic elements, Nounness and Verbness, which combine in two idea word patterns, called Primary Image and Conditional Image, and two Detail word patterns, called Process Detail and Background Detail. These two basic elements, Nounness and Verbness, function binarily within the program, either in combination for the two Image word patterns or separately for the two Detail word patterns. All word terns, except the verb-in-tense in the two Image word patterns, function binarily within the program in one of two positions: as Nounness, called Nesting, or as modifiers, called Qualifying. Since meaning in an English sentence is determined solely by word and word pattern location, binary units can be created which allow meaning to be changed by moving words or word patterns from one location to another, called Flipping. Natural language, thus organized into binary units, can be thus analyzed in computer programs for purposes such as, but not limited to, natural language processing which is not restricted to limited language domains, voice activation, machine translation from one natural language to another, context analysis of documents, data base searching, syntax analysis of documents, and the teaching of writing in natural language.

17 Claims, 5 Drawing Sheets

| PATTERN NAME | ELEMENTS ≠ SINGLE WORDS ||||| |
|---|---|---|---|---|---|
| | ELEMENT #1 SEPARATE TRIGGER | ELEMENT #2 AGENT/ DOER | ELEMENT #3 MOVEMENT/ DOING | ELEMENT #4 RECEIVER (AGENT) | AGENT USE SUBSTITUTE | QUALIFIER USE (ADDED INFO) |
| PRIMARY IMAGE | — | | | | | — |
| CONDITIONAL IMAGE | | | | | | |
| PROCESS DETAIL | | — | TO + M<br>M + ING<br>M + ED<br>(4) | | — | |
| BACKGROUND DETAIL | | — | — | | | |

FIG. 3

METHOD AND DEVICE FOR PARSING AND ANALYZING NATURAL LANGUAGE SENTENCES AND TEXT

FIELD OF THE INVENTION

This invention provides a computer-implemented method and device for parsing and analyzing natural language sentences. The program is text-based and divides language into binary elements. In the embodiment described herein, the method and device are applied to the parsing and analyzing of English language sentences through a computer program. However, any language may be similarly parsed, and analyzed. The results of the parsing and analysis give information about the sentence or text in connection with word order and meaning. The method and device further provide for determining alternative constructions to a particular sentence, so that the user is made aware of possible alternative choices in controlling the meaning of a sentence or text, or potential ambiguities in the sentence meaning. By the method and device of the invention, the user becomes aware of subtle nuances in meaning or multiple perspectives and then may choose among the alternatives in order to convey the meaning intended or meaning otherwise not anticipated.

BACKGROUND OF THE INVENTION

Numerous attempts have been made in the art to classify language into a particular scheme for using a computer system. These attempts have particularly focused on determining meaning, on a word-by-word basis, according to a look-up scheme in a dictionary. While varying degrees of success have been obtained, these systems have been driven by rules of traditional grammar which ignore the flexibility of language, thus making it rigid and difficult to use, not reflecting the natural thought process.

For example, U.S. Pat. No. 4,864,502, issued to Kucera, et al., describes a sentence analyzer which identifies noun phrases and verb groups. A separate analyzer then determines clause types. Similarly, U.S. Pat. No. 4,887,212, issued to Zamora, et al., describes a parser which isolates word groups and provides verb group analysis and clause analysis. Neither of these patents describes a software application that classifies text into binary units and which further classifies combinations of these units into binary word patterns, and binary placements for them. Nor do they present alternate choices of meaning to be presented to the user.

U.S. Pat. No. 5,146,405, issued to Church, describes a method for determining parts of speech based on statistical data of actual usage. The deficiency in such a system is that it is tied to the statistical data relating to the actual usage of individual words. This is because it exclusively relies on such arbitrary data to determine part of speech.

U.S. Pat. No. 5,297,040, issued to Hu, describes a method of processing language, where correct sentence structures, the prescriptive structures, also referred to by Roderick A. Jacobs and Peter S. Rosenbaum, as "school grammar," are those whose words bind to their neighboring words in a particular manner rather than in a descriptive structure.

Another aspect of school grammar, which we refer to here as prescriptive grammar is its insistence t-hat old, even now archaic, forms must continue in use and that many new formations must be excluded . . . . It [prescriptive grammar] fails to recognize that language is an innate attribute of human nature Prescriptive grammar is thus not very much concerned with the nature of language as such, nor with the nature of English in particular. It is interested instead in "correct English," that is, in enforcing the use of one particular dialect. The interest here [in surpassing prescriptive grammar] is in the vast body of structural and syntactic principles which are common to all varieties of English rather than in the minor details which differentiate them. [*English transformational Grammar*, Jacobs and Rosenbaum, Blaisdell, 1968]

There is a need for an invention which is responsive to Jacobs and Rosenbaum which embraces individual combinations of contextual blocks of meaning whether or not they violate the rules of prescriptive grammar.

"Prescriptive", a term of art, assumes a right or a wrong grammatical use in sentences. The usefulness of a prescriptive system is predicated upon the mistaken assumption that the goal in writing is correct structure rather than an understanding of the structure of meaning. Further, a problem grows from the number of possible combinations of meaning grows exponentially with the numbers of words in a sentence. Thus, in systems such as Hu's, a means to limit the number of words in a sentence subscribes to the presumption that a simple sentence is a better sentence. b a prescriptive system of "right" and "wrong", the corpus of rules assumes that English words have one meaning per word. Because English operates very differently, having multiple meanings for words, the prescriptive grammars create a problem. The prescriptive grammars need to control by limiting what happens when a word with one of its particular meanings in a given situation binds another word to a particular meaning. Thereby, such a limit actually tries to prevent the occurrence of multiple meanings. The mistake occurs because limiting a word to how it binds or obligates adjacent words limits the number of possible combinations. Further, controlling language meaning, by limiting its adjacent combinations, obligates English to function in a manner opposed to its actual nature. While this may certainly be argued to be true in the Hu system it unnecessarily limits the variety of words that a parser may handle. Also, it restricts the invention to limited language domains where only one meaning of a word would serve the user. For example, the system may be limited to airline reservation systems.

U.S. Pat. No. 5,146,406, issued to Jensen, describes a method for determining predicate-argument structures by a double parsing system. The first parse analyzes syntax; the second analyzes argument structure. Like other systems, Jensen also utilizes a "best guess" technique that is not well-suited for handling diverse language systems because often errors result.

U.S. Pat. No. 5,101,349, issued to Tokuume, et. al., describes a method for analyzing language, including grammatical functions and condition functions. Also according to Tokuume, et. al., phrase structures may be generated by the grammatical definition using stored grammatical rules. However, such a system is tied to complicated tree and node analysis that necessarily limits its flexibility because of the vast number of exceptions that such a system cannot account for.

For example, *The spaceship photographed Seattle flying to Mars.*

THE NEW YORK TIMES, Sep. 1, 1993, in reviewing Microsoft's current research, uses this example to illustrate the object-based research pursued by Microsoft's team of linguists and computer scientists. Microsoft's syntactic analysis uses semantic clues, from dictionary definitions, to conclude whether or not Seattle can fly to Mars and thereby forcing a movement of the sentencing to the following:

*Flying to Mars, the spaceship photographed Seattle.*

However, presumptions made from linguistic decisions such as literal vocabulary definitions and the existence of verb phrases limits user meaning and the actual descriptive function of meaning in English. In some conceivable instances, Seattle can fly to Mars. If the user intends to say that Seattle does fly to Mars, then the original meaning should stay intact. Object-based programming, however, does not accept any sentencing but that which assumes that Seattle cannot fly. Furthermore, and very importantly, the user may intend a conditional meaning which an automatic re-writing by the computer would obscure. For example, the user may have implied "when the spaceship flies to Mars" or "if the spaceship flies to Mars," and so on with the other Conditional Triggers. Therefore, the object-based assumption of directing meaning by the limits of vocabulary actually prevents the real options for re-framing meaning which exist in the context of English.

SUMMARY OF THE INVENTION

The present inventive program overcomes the deficiencies of the above prior art. The present program provides a natural language text parser, which may be used for all natural languages, and for the syntactic analysis of text which is simpler, faster, and more compact in memory transfer than those of prior art. To accomplish this, the present program syntactically categorizes and depicts all possible constituents, i.e., all possible word and word pattern combinations, which comprise natural language. It also depicts, in algorithms and on the screen, the order in which all possible constituents, i.e. all possible word and word pattern combinations, can combine. The present program provides a method and device to provide linguistic and morphological analysis on a text corpus to derive part-of-speech, and ultimately semantic information, even if a match is not found in a look-up dictionary for a particular word in the text. The present program also provides a language analyzer, parser, and editor which use a finite set of very simple grammatical and syntactical rules, rather than a large, set of complicated grammatical rules, which merely apply a better approximation. Instead, simple rules in the present program encompass and include the individual variation of language use. Thus the program allows the analysis of any text in natural language.

The present program provides a language analyzer which is context-based, rather than object-based. In such a system, it is word order that determines meaning in context, rather than having the lexical definition alone determine the word order. In the same way, the present program treats the sentence as a whole initially and then classifies the individual words and word patterns, as opposed to focusing solely on individual words and how they bind to other words.

The program breaks the paradigm of chaining words together from left to right to create meaning, and thereby allows the reader to overlap and connect versus chaining meaning. Therefore, the user chooses the word-pattern framework.

The present program gives the user the tools necessary to recognize word groups identified in traditional grammatical terminology within a sentence, as well as named as the invention's constituent word groups. The present program enhances the user's ability to perceive the four basic constituents of language as binary elements of what are termed herein and defined below as Primary Image, Conditional Image, Process Detail, and Background Detail placed in binary positions, where binary refers to the two-part Nounness positions of Doer or Receiver, and the second position as Qualifier.

In particular, all words and constituent-element word groups in English, except verb in tense, function in the program as Nounness or Qualifiers where Nounness operates as any placement of a word or constituent element as a noun including a word defined as a single word noun naming person, place, or thing.

As used herein by the program, Qualifier refers to the vernacular term "modifier", including single-word adjectives and adverbs, but herein also encompasses constituent-element word groups placed as modifiers.

Further, Verbness, as used herein by the program, encompasses two completely different uses of the vernacular term for verb as defined as a word expressing action or state of being. Whether such a word operates by formula with spelling changes, or in combination with auxiliaries, to form verbs in tense, or whether such a word follows the constituent element patterns used herein as Process Details and called in conventional grammatical terms the verbals (the participle, past or present, gerund, or infinitive), the term Verbness includes interchangeably the power of the verb to function as a constituent element of Image or separately, by formula, as a Detail constituent element.

Further, Equalizers, as used herein by the program, include the terms and lists in conventional grammar, known as conjunctive adverbs and coordinating conjunctions, and encompassing all words or phrases used to introduce or join Primary Image with an Equalized relationship. These words Trigger relationship which signal equally weighted idea relationships. Please see Appendix 1 for a list of these.

Further, the Conditional Triggers as used herein by the program include the terms and lists in conventional grammar, known as subordinating conjunctions and relative pronouns, and encompassing all words or phrases used to introduce, create, and join Conditional Image to sentences. These words Trigger relationships of ideas which either support or limit by circumstance the meanings to which they are attached as Nounness or Qualifier. Again, please see Appendix 2 for a list of these.

Further, the Process Detail Triggers as used herein by the program function by formula as added to the structure of verbs preventing them from use as verb in tense. The Process Details add meaning of past, on-going, or future processes to other parts of the sentence to which they are attached as Nounness or Qualifier. Again, please see Appendix 3 for a list of these.

Further, the Background Detail Triggers used herein by the program include the terms and lists in conventional grammar, known as prepositions, and encompassing all words and phrases used to introduce, create, and join Background Detail to a sentence. These words Trigger and add relationships of time, place, and grouping as meanings to other parts of the sentence to which they are attached as Nounness or Qualifier. Again, please see Appendix 4 for a list of these.

These objects are met by the method and device of the present program for parsing natural language text. This program categorizes parts of an inputted text into one of four patterns symbolized by colors on the computer screen. The present program classifies syntax in natural languages such as English. The invention may be advantageously used, for example, in the context of a syntax checker or natural-language processor. In one embodiment, the invention comprises software, which dissects text, classifying its components into two units denoted herein as: Nounness and Verbness. These units are optionally combined in the formation of different types of word patterns. A provision for positioning the word patterns of the text in different locations allows the user to vary the text's meaning. Such analysis provides a way to communicate the textual meaning of a document in terms understandable by a digital computer.

In the present program, as implemented by a computer program, the two basic binary elements of natural language, Nounness and Verbness, combine in two Image word patterns, denoted as Primary Image and Conditional Image, and two Detail word patterns, denoted as Process Detail and Background Detail. The two basic elements, Nounness and Verbness, function binarily, either in combinations for the two Image word patterns or separately in the two Detail word patterns. All word patterns, outside the verb-in-tense, function binarily in one of two positions: as Nounness, called Nesting, or as modifiers, called Qualifying. Since meaning in a natural language sentence is determined by word- or word-pattern location, the meaning can be changed by moving word patterns from one location to another, called "Flipping". Natural language thus organized into binary units constitutes the parsing method and device of the present invention as expressed a program for purposes such as, but not limited to, parsing sentences, analysis of meaning, natural language processing, context analysis of documents, data-base searching, syntax analysis of documents, and the teaching of writing in the English language.

Embodied in the present invention lies a variety of applications. The present invention establishes a base line for emulating textual thought which moves the use of text past the current field of simply text processing. Text becomes an extension of thought represented on the screen as bigger patterns of meaning in context combinations rather than solely a string of words from left to right. Therefore, an extended variety of applications includes any representation of text as inputted by voice, for example, or as text intended to be communicated in written form which the user rearranges and re-orders for varied and multiple options of connected and developed thought. Once combined with voice processing technology, the user will be able to speak text while seeing its context framework arranged and highlighted in color on a computer screen. The present invention, e.g., addresses the occurrence of homonyms because fixed word order clearly determines by context that the word "to" could never be used interchangeably with the word "too", for example. Even a spoken homonym must have fixed word order placement which the present invention correctly identifies. Further applications include natural language processing and programming, machine translation, data-base searching, "text engine" document search, artificial intelligence and other language-related applications. Currently, the industry is searching for natural language solutions for these applications, but the object-based solutions cannot solve problems created when vocabulary words either sound alike or have more than one meaning.

The present invention allows an architecture for symbolizing constituent elements and components of thought reducing the flow of data on optic fibers, for example, to very small pieces of information. Data flow with language can become compressed in a binary fashion with the present invention adapted to telecommunication. Also in the field, machine translation for foreign languages frustrates users because the literal word-for-word translations cannot account for the differences between inflected languages and a language which depends on word order for meaning.

The present invention provides a means of identifying syntax in English. Therefore, the present program can serve as the foundation for comparing English syntax to that of other languages for the purposes of teaching syntax from one language to another or for machine translation. Further, the binary nature of the present invention offers a solution for creating a natural-language programming code which can dependably operate without debilitating exceptions. An example provides herein a sample of how symbols could represent larger pieces of meaning for symbolic encryption.

The goal of the present invention is to create a computer program to identify the algorithmic architecture of language which identifies bigger blocks of meaning than single words. The computer program, by means of this invention, operates from blocks, or patterns, of meaning which, in turn, operate by symbolic formulae. The present invention analyzes what the user originates through an inputted text. In such a fashion, the present invention changes the technology from an object-based premise to a context-based foundation for examining the chain of events which the user has connected as a particular thought. A context-based architecture creates a technology where the user can predict new directions of thought and meaning beyond the object-based definitions of words in isolation which does not provide any means for the user to control changes in options of thought. The present invention, therefore, accounts automatically for the differences in meaning inherent in single words as they connect to produce varied meaning by changes in context.

The following examples illustrate how a context-based word order influences the meaning of connected words in context.

a) The dog bit the man.
   The man bit the dog.

In these two sentences the identical vocabulary has completely different meaning in context.

b) We will wind the clock.
   The wind blows.
   Clock my time as I run.

The present invention identifies the differences in multiple meanings for identical forms. Without the context placement, the user cannot know which meaning of "wind" or "clock" applies. In the case of "wind," the pronunciation changes as the context changes; in the case of "clock," however, the meaning change does not coincide with a change in pronunciation to reflect the change in meaning.

In both cases, however, the current program creates the context meaning without the necessity of pronounced verbal clues. The current program uses the written text and context structure to indicate the differences in word definitions from fixed-word-order placement.

c) My uncle owns a still in West Virginia. When the tax people search for him, he stills the engines and hides under the still, lying very still; still, he runs his still next to the still-life store.

Any English speaker knows that context changes the meanings of the word "still". The present invention identifies these changes without dictionary definitions to choose from in a look-up dictionary.

d) 'Twas brillig, and the slithy toves
   Did gyre and gimble in the wabe;
   All mimsy were the borogoves,
   And the mome raths outgrabe The present invention organizes bigger blocks of meaning by defining the syntactical architecture which has given these famous, nonsensical lines from Lewis Carroll's "Jabberwocky" context-based meaning. Therefore, the individual words do not have lexical meaning but, on the contrary, are not nonsensical lines because they have context meaning.

Thus, the context-based architecture of the present invention creates a syntactical paradigm which supersedes literal, object-based programming.

BRIEF DESCRIPTION OF THE FIGURES

FIG. 3 is a table of binary constituents which describe the constituent elements and comparatively align their elements.

DETAILED DESCRIPTION

Figure 1:
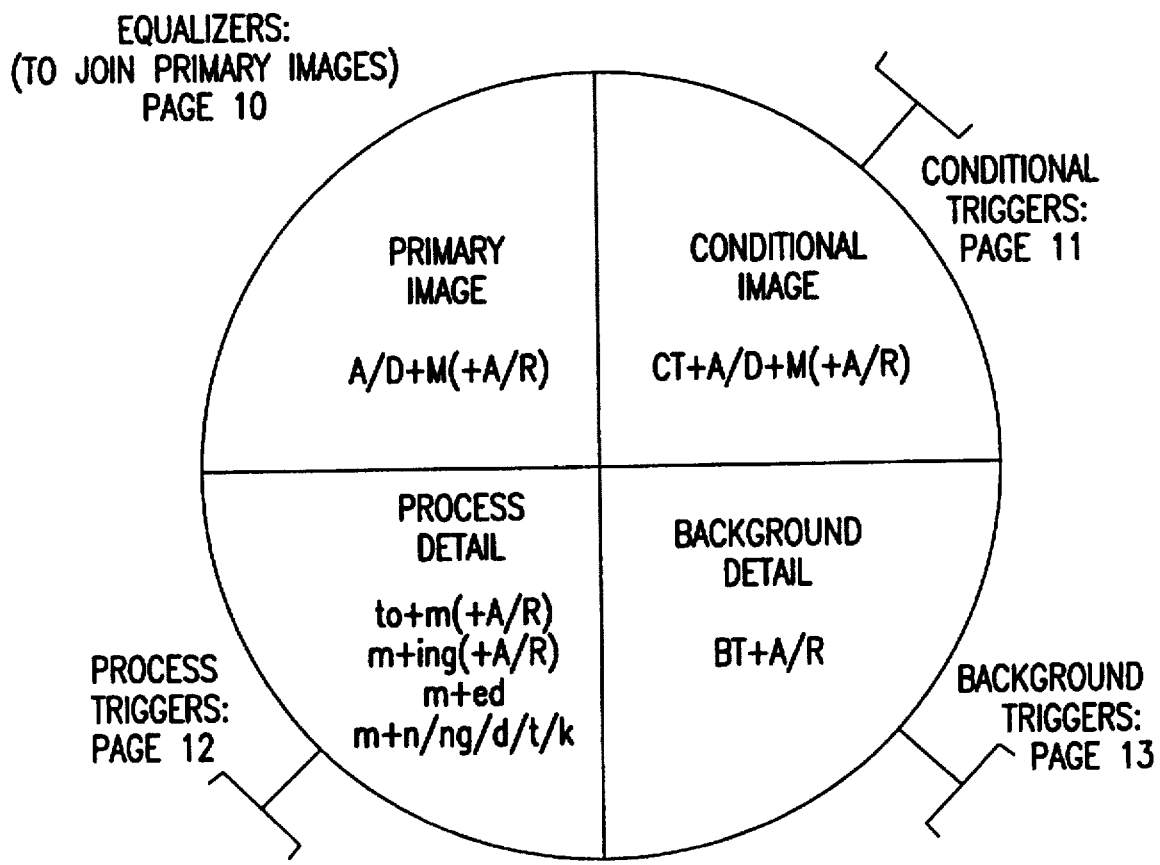
FIG. 1 shows a diagram of the structures into which the present program categorizes natural language.

The present invention is a computer-implemented parser for natural languages which supersedes traditional, generative, and object-based analysis by creating a binary architecture which defines context and parts of speech by word order in any use of language text. As such, it may be implemented on a computer, for example, within a software program or coordinated with a voice-synthesizing program or product. Provided a requisite amount of memory is available, it may also be implemented directly in a hard-wired system, such as in ROM chips. Moreover, while reference will be given to specific steps, it is clear to one skilled in the art that a number of different types of code may be used to implement these steps.

An embodiment of the present invention was first written in the language C and was enhanced in C++. A system of 4 MB would be sufficient to run the program. Please refer to the attached example 2 for a detailed description of the hardware specifications.

A first step in the program is the inputting of a stream of alphanumeric data delimited by a punctuation mark. More than likely, in the typical text to be analyzed, there will be a number of punctuation marks indicating a number of different sentences. Generally, in the what may be termed the "group mode", an entire file of text is analyzed at once or the user may choose to select only a part of a file for analysis. This text may come from a number of sources. For example, it may be imported from an ASCII text file, or it may come from a text file having a predetermined format, such as that from a standard word processor program. Alternatively, the user may create an original document within the program itself. Additionally, it may be imported from a magnetic tape, or from a data file stored in a semiconductor memory. Of course, numerous other methods may be used to store the data file as is well-known in the art.

The menu and tool bar options are described in detail in example 2. The screen colors serve as an integral aspect of the actual presentation and working architecture of the logic which presents the results of the analysis to the user. In no way can the colors on the screen be considered as merely secondary or decorative graphics, but instead they serve as an integral element of the program's operating system as the source of context meaning for the user. The colors and their significance are described more fully later. The program of the present invention can be run by a typical CPU with a standard keyboard used to effect choices of menu or tool bar commands.

The program operates on the premise that the verb is the "axis." As such, the location of the possible verbs must be located first. This is done in conjunction with a dictionary look-up system in which the dictionary comprises words categorized as one or more parts of speech. This dictionary contains no lexical definitions. Accompanying the dictionary look-up system is a word-order analyzer which separates the possible verbs from other words by word order and morphology, to be explained later with reference to a specific embodiment. In this way, the definition and isolation of the verb is performed by the system.

The Help system is not a tutorial in the embodiment described of the program; it serves as an actual interface between the logic of the system and the user's needs. The user makes changes in meaning from among the options offered by the Help system while, within the working of the internal programs, the order of the searching logic describes and re-describes the constituent elements of the user's text. Example 2 contains a detailed description of the mechanism and order of the searching logic.

A similar search and word-order analysis is performed in this respect in separate searching steps regarding the remaining parts of speech, including, and preferably in this order: noun, pronoun, adjective, adverb, conjunction, preposition, interjection.

After the word-isolation step is completed, the program moves on to analyze the constituent elements, i.e., the word patterns, of the text. These constituent elements are of four basic types: Primary Image, Conditional Image, Process Detail, and Background Detail. Prior to discussing these constituent elements in more detail, however, it is important to note that a word search is also conducted to determine the presence and location of certain words which function as Triggers for Conditional Images, Background Details and Process Details, and between Primary Images. Conditional Triggers are words which signal Conditional word group patterns for conditional relationships among Images. Conditional Triggers include subordinating conjunctions and relative pronouns and any combinations of words which serve as Conditional Triggers and are listed as such. Of course, for purposes of the program, they comprise a data file filled with an exhaustive list of these types of words. Background Triggers are words and combinations of words which signal Background word group patterns for background data added to other constituent-element word groups. Background Triggers include prepositions and are listed as such.

Background Triggers signal background: specifically, of time, place, or grouping.

Another type of Trigger for which the program searches is the Equalizing Trigger which signals Equalized and paired relationships among words and groups of words. These include conjunctive adverbs and coordinating conjunctions and are listed as such in Appendix 1.

The four basic types of word patterns, i.e., constituent elements, determined by the program, are the Primary Image, the Conditional Image, the Process Detail, and the Background Detail. These word patterns, or constituent elements, are shown in FIG. 1.

Example:

Primary Image: The system failed.

Conditional Image: Although the system failed

Although the original data does not change, the program recognizes that the flow of the thought automatically alters simply by the addition of the Conditional Trigger which creates a circumstance and a contrast, along with creating the expectation in a software user of additional meaning. On the other hand, the use of a different Conditional Trigger will replicate these changes while creating entirely different meaning:

For example, Unless the system failed
   Process Detail To fail
      To fail, the system must by-pass two defaults.
     failed
      The failed system had backups which saved the data.
     failing
      The system's failing rightened the client.
   Background Detail: in the budget department
      The system failed in the budget department.

The present program identifies a Primary Image whenever it finds a function of Nounness followed by a verb, where Nounness is defined as any Conditional Image, Process Detail, Background Detail, Primary Image in quotation marks, single-word nouns or multiple single-word nouns, personal pronouns, indefinite pronouns, or demonstrative pronouns. Any part of speech or word construct which functions in one of the binary Nounness locations, by formula, serves as Nounness as defined within the computer program. When followed by a verb, Nounness is denoted an agent/doer, and classifies as the subject of a clause, i.e., an Image. The present program will find a Primary Image rather than a Conditional one when the agent/doer, followed by a verb, is not preceded by a Conditional Trigger. If it is preceded by a Conditional Trigger, a Conditional Image will be identified by the program.

| | |
|---|---|
| Conditional Image | What she said inspired me. |
| Process Detail | Her saying that inspired me. |
| Background Detail | At issue is her job. |
| Primary Image in quotation marks | "I like him" is what she said. |
| single-word nouns | The speech surprised me. |
| multiple single-word nouns | Her speech and manner surprised me. |
| personal pronouns | She spoke. |
| definite pronouns | Someone spoke. |
| demonstrative pronouns | That is what she said. |

Nounness has two placements in the program: doer or receiver. All of the examples above demonstrate the doer position but can be "Flipped" by the program to the other, receiver position. In the program, the receiver position follows a verb in tense in either a Conditional or Primary Image. Moving the above underlined examples to the other side of the verb would change the Nounness to a receiver position and therefore change the meaning of the sentence significantly. In the program, the doer position of Nounness occurs only in the two Image constituents. Both Image constituent elements contain the receiver position and both Detail constituent elements can contain receivers within the method of the invention. In the program, the Background Detail contains the receiver as an integral part of its formula but the Process Detail does not have a receiver when the Process Detail has an intransitive property. Also the -ed form of Process Detail never has a receiver within the method of the invention. Within the program, the only shift in position which would require a change in wording for the constituent element is when the personal pronoun must change its case from nominative to objective, in the terms of conventional grammar. The so-called nominative case pronouns function within the method of this invention solely as the doer or following a linking verb in tense, just as the objective case pronoun, as it is known, serves solely in a receiver position.

Although these pronouns exist for that purpose, variations may occur because individual use in a dialect structure does not change the context and because fixed-word order has more meaning than do the words chosen to be put in those positions. The patterned positions of fixed word order, not vocabulary, control meaning, e.g., *Him and me went to the store*, or *I want to know who he chose.*

A typical document may say a great deal more in context than vocabulary alone. The present invention allows a simple, effective, and powerful contextual insight not otherwise accessible. Examples in this description will illustrate the ease of insight through the color-coded text analysis. However, in the present application, such colors will be denoted by boldface, italics, underlining, small text, and normal text.

One illustration of Nounness, which also showcases the program's nesting function and the inter-relationship of writing processes, follows. Wording from the first sentence will illustrate. The passage, "for understanding and forecasting the structure, variability and dynamic interaction," combines the Process Detail with a Background Detail. The word "for" Triggers the Background Detail context which the present invention would color orange. The phrase, "understanding and forecasting the ocean's structure, variability and dynamic interactions," uses the Process Detail formula to create the context of a process (done by the agency in the document, NOAA) and places it as the receiver of the Background Detail. The present invention colors the Process Detail green, superimposing it on an orange background to illustrate the Nesting, or Nounness, function. The full text of the example follows and a full analysis is given in Appendix 5.

Our present source of information for understanding and forecasting the ocean's structure, variability and dynamic interactions with the atmosphere is a loosely organized network of global satellite and conventional observations. This ocean network is a diverse composite of operational and research measurement systems and platforms operated by an equally varied group of responsible agencies, including NOAA, each with different missions and objectives. The measurements from this network serve often unrelated objectives that are dictated principally by the different missions of each operating agency and program. Consequently, the network is a costly, poorly coordinated mixture of observing systems with little commonality among them. Thus, we experienced the situation where some ocean regions have no observational coverage at all while other areas may have a significant amount of data being collected. Furthermore, incomparabilities in platform type and location, measuring instruments, data formats, quality control procedures and communication links, combined with inadequate operational data assimilation capability precludes full exploitation of the information that is available. This is a costly, inefficient, unacceptable situation for operational ocean forecasting. The problem is exacerbated by the inability to handle both the increasing volume of data from satellites (and real time automated conventional systems) and the expected increase in observations of all kinds needs to satisfy the requirements of fine resolution models for increased forecast accuracy.

In the present invention, Primary Images themselves must be joined together by Equalizers including conjunctive adverbs or coordinating conjunctions or a semicolon. Conditional Images must be joined to other Images and to each other in a similar fashion, these Conditional Images being initiated and joined by Conditional Triggers, including subordinating conjunctions and relative pronouns. As used herein, the term "join" may refer to adjacent constituent elements of Image in the case of Qualifier; or the term "join" may refer to nonadjacent, that is, stacked, or Nested, Images used as Nounness in which the Conditional Trigger introduces a Conditional Image which itself operates as part of another constituent element.

Using the above text example, the joining of concepts with Equalizers and Conditional Triggers provides one of the few clues to the intended meaning of the author. The following sentence therein illustrates Equalizers. "Consequently, the network is a costly, poorly coordinated mixture of observing systems with little commonality among them".

The Equalizer, "consequently," ties the prior Primary image to the Image following "consequently". This Equalized relationship creates a causal meaning that would not otherwise be understood.

In the text, two Conditional Triggers specify where the data has relevance.

The following examples illustrate Conditional Triggers" " . . . where some ocean regions have no observational coverage at all while other areas may have a significant amount of data being collected".

Within the inventive program, the Conditional Triggers, "where" and "while" specify particular conditions applying to the identified ocean regions, preventing generalization.

The Image creates the basic unit of an idea in the present program. The movement, or verb, within the Image creates the core of that idea. As used herein and in the program, the word 'movement' refers to any verb in tense which expresses mental, physical, or emotional "doing" initiated by a "doer", that is, a form of Nounness fulfilled by a word or constituent element. Without the movement, the program recognizes no Image. In fact, this movement unit serves as the "axis" of the Image. Even an Image with only the movement stated has a doer understood by the computer, such as in commands. The verb is the axis of the Image, and every sentence in the program must have at least one Image.

Conventional grammar describes verbs as action words. The modern user, therefore, can feel lost or confused if verbs do not suggest, visually, physical action. From a lexicon of 155,000 words, the text corpus of a collegiate dictionary, for example, contains approximately 9400 verbs. A significant proportion of these verbs do not in any way express *physical, visible movement*. Verbs may express movement but without a physical embodiment. Even thoughts and emotions constitute a type of movement. Similarly, existence constitutes a "movement" in time and space. Therefore, the present program identifies "Verbness," whether as a form of tense in Image or as a Process Detail, to be movement. Examples of such verb movement can be physical, mental, and emotional.

Physical: walk, run, see, take, speak, paint, talk. . .
Mental: think, meditate, consider, seem, appear, remain
. . . Emotional: feel, love, hate, resist, wish . . .

English has a lexicon of 17 so-called linking verbs. They serve to show equality between the doer and the receiver or a receiver and some prior referent. This lexicon contains a few verbs which distinctly mean "existence" or some shade of existence.

Existence: to be, is, are, were, was, were, am, been, being, seem, become, appear, remain, feel . . .

The term "axis" refers to the position of verb as it occurs in tense in Images within the program because the sentence, or multiple clauses within sentences, cannot exist in English without the verb placed in near proximity to its Doer. At its simplest level, a verb which serves as a command can serve in one word within the program as a full sentence because its Doer is a silent and universally understood "you".
Example: *go*.

What you are *is* what you eat.

The verb in tense in this example is the word "is". Contrary to conventional descriptions of English and the current usage of those in the field of linguistics, the verb "is" does not allow for completed meaning in a simple sentence form by any stretch of the imagination. Within the inventive program "is" serves as the axis between the Doer and the Receiver and, thereby, the present invention would color "is" blue to indicate that the Primary Image axis of this sentence example serves to support the relationship between the doer and receiver and cannot, thereby, serve as meaning by itself. In linguistic terms, the verb in tense initiates the verb phrase. However, in the present invention, the verb in tense does not serve as a Trigger for forthcoming meaning. Rather, the verb in tense is an axis around which the meaning revolves for each Image.

To summarize Images, the combination of Nounness and Verbness creates a Primary Image. If the Primary Image is preceded by a Conditional Trigger, however, a Conditional Image is created.

| Primary Image | The system failed. |
|---|---|
| Conditional Image | Although the system failed . . . |

Thus, the Image is a combination of Nounness and Verbness. Of course, it is important to note, as the prior examples illustrate, that certain varieties of verb forms, Process Details, such as infinitives, participles, and gerunds, may function as Nounness.

Besides Images, the other set of word patterns is the category of Details. The program categorizes Details in two different sub-categories: Process Details and Background Details. In contrast to Images, Details are not combinations of Nounness and Verbness. The program recognizes two binary elements in English, Nounness and Verbness. Together they form an Image and separately, they form the two Detail patterns.

Process Detail . . . *failing* . . .
Background Detail . . . *in the system* . . .

In the above Background Detail, the program would note that the Nounness "system" operates as the receiver of the Background Trigger but does not combine with Verbness. In the above Process Detail, the Verbness "failing" operates within the program as a Process Detail without connection to nounness/doer. Therefore, the two, binary, constituent elements of Nounness and Verbness comprise the two Detail structures when they operate separately from each other.

For example, a Background Trigger, which is conventionally a preposition, typically comprises a Background Trigger preceding an Agent/Receiver. That is, a Background Trigger precedes Nounness. Please see Appendix 4 for a list of those Triggers.

By contrast, a Process Detail within the meaning of the program has more of the qualities of Verbness. Although visually, the Process Detail looks like a verb, the Verbness here does not create an event or idea, as does an Image. The present program notes that the Process Detail has the qualities of a verb including one of the transitive, intransitive, or linking properties as well as the expression of movement; but the Process Detail never has tense. For example, the combination of the word "to" and a verb, with an optional agent/receiver, may create a Process Detail. Similarly, verbs ending in "-ing", with an optional agent/receiver, verbs ending in -"ed", as well as verbs ending in certain specific, irregular endings (-n, -ng, -t, -d, -k), typically create Process Details and would be colored appropriately in the present program. Process Details have no agent/doer. They may have agent/receivers, however.

Furthermore, Process Details in and of themselves function as either agent/doers or agent/receivers or as Qualifiers. Please see Appendix 3 for a list of these.

Auxiliary verbs are also considered. These verbs operate in conjunction with verbs in tense without changing the tense meanings. They add possibility, or conjecture, but do not, in this program, in any way alter the patterning of tense use. Please see Appendix 8 for a list of these.

Figure 4:
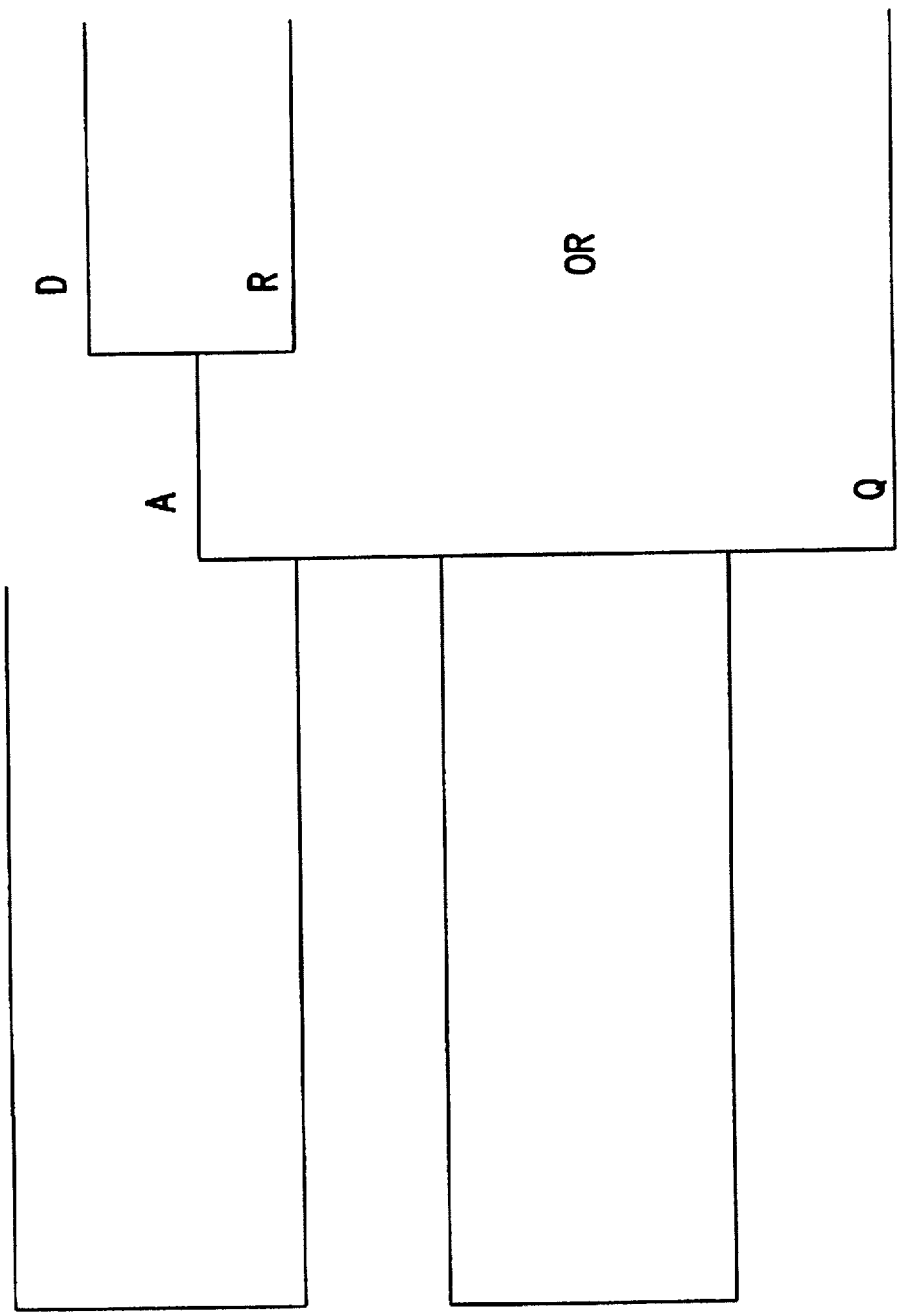
FIG. 4 is a flip chart illustrating how the computer determines options to move or Flip data from one pattern to another and then how to place these patterns once structured.

The program's identification of the various types of word patterns and their locations, as described above, determines the meaning of a sentence. Since context meaning in an English sentence is determined by word and word-pattern location, binary units can be created which allow meaning to be changed by moving words and word patterns from one location to another, called "Flipping" in this embodiment of the invention. FIG. 4 shows the allowable Flipping options.

The reader's understanding drives the meaning as determined by the computer. The user of the present program can either write what seems to fulfill the intended meaning, then vary the placement to choose optional meaning, or, the user can read documents from other people to determine by context either the intention of the text or how to respond in like manner, contextually. The following sentences illustrate from among the various allowable placements, in fixed word order context, available for the arrangements of constituent elements in thought patterns.

Flipping options. In other words, changing the pattern, or meaning.

What she said inspired me.

I love what she said.

Although influenced by what she said, I made another commitment.

Wanting what she said to influence the staff, I raved about her and her speech.

Although what she said inspired me, I had to try my own plans first.

The user may choose to simply Flip the Verbness in an Image to a Process Detail:

Saying that influenced me. The Process Detail "saying that" can be Flipped to any qualifier or nounness position:

I resent her saying that.

To suggest saying that constitutes the worst type of irresponsibility.

By saying that, you have supported me.

From the above sentences, a word or phrase used in a Nounness position may be Flipped to another Nounness position which would change the meaning significantly.

Example: My commitment changed significantly after what she said. Our original friendship grew from shared commitment. Wanting her commitment, I pressed her for her opinion. Although I wanted her commitment, I accepted her promise.

The Flipping function allows the user to re-format data and thereby to access different contextual relationships and allowing the user multiple varied options for connecting thought.

The data in the constituent element may, as in this case, stay in exactly the same form from one sentence placement to another. However, the meaning that the information flow creates from the way the constituent element connects to another constituent element by changing placement completely alters the knowledge imparted.

The present program uses the fact that word pattern location determines meaning to present multiple perspectives to the user while the user analyzes a particular sentence or text. These alternatives are combinations of Images and Details or the data in them in different orders. Obviously, many different meanings can be conveyed by many different constituent element orders. In fact, once a user changes the pattern, the meaning is usually changed also. The user can choose among sentencing options and thereby weigh emphasis and focus, and thereby locate potential ambiguities and create the meaning intended. In this way, the user can choose the least ambiguous combination of words or uncover a completely different interpretation for the same data.

Figure 2:
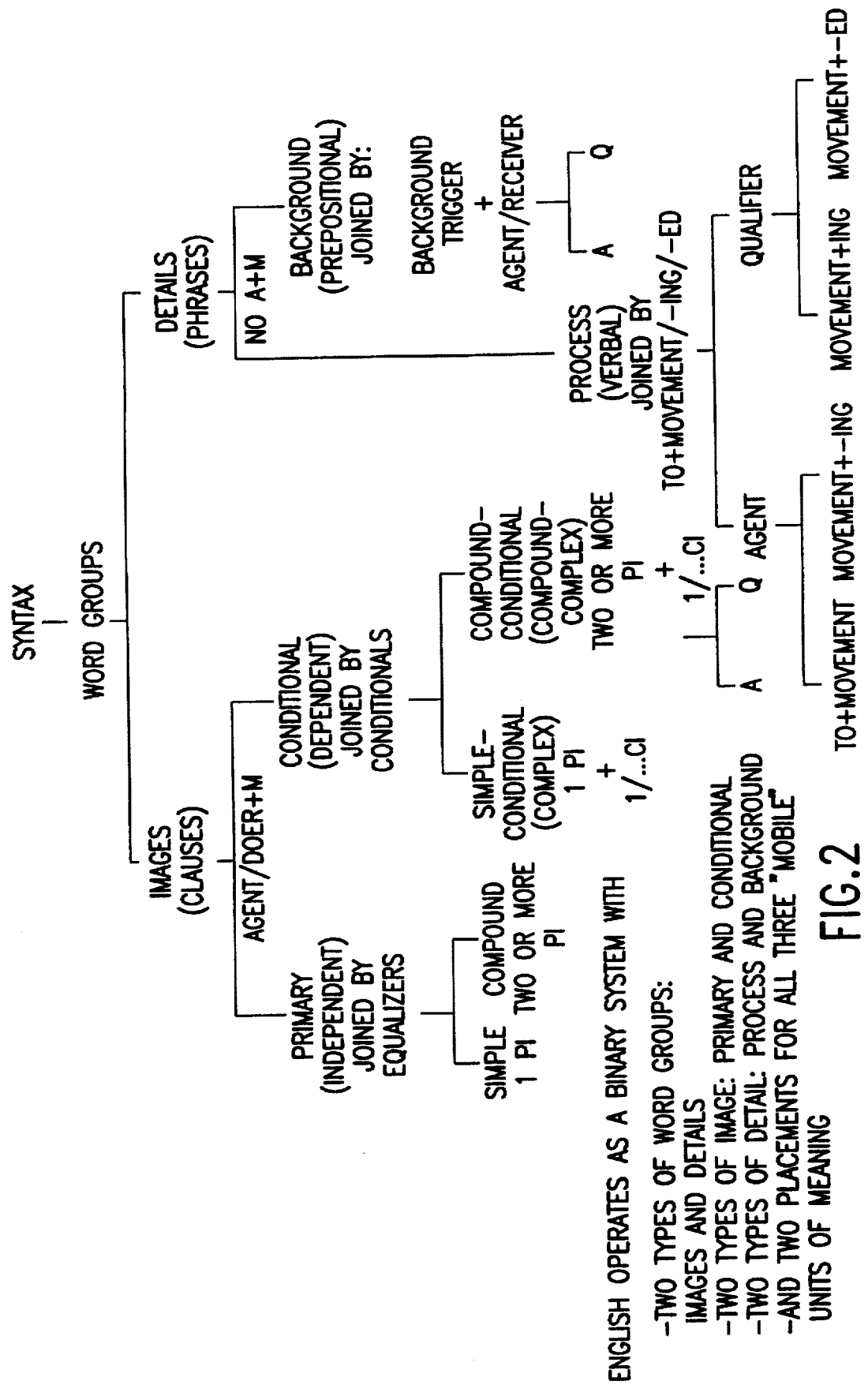
FIG. 2 shows a diagram of the various binary constituents of FIG. 1 and their flow to binary placements.

It should further be noted that the division of word patterns in the method of the present invention into Primary Images, Conditional Images, Background Details, and Process Details may be continued by the categorization of three of these types of word patterns into two further categories of placement as Nounness and Qualifiers. Primary Images can be forced into these placements if the Primary Image is set first in quotation marks. This is because Conditional Images, Background Details and Process Details must be used in and of themselves to create either Nounness or Qualifier. Primary Images do not ordinarily function as Nounness or Qualifier. FIGS. 2–4 all illustrate these binary placements. The sentence examples given later represent the allowable Nounness and Qualifier placements.

In addition to the foregoing, Images and Details in and of themselves may be used to show the user the underlying, contextual meanings being communicated in the text. For this purpose, the present system advantageously colors the Images and Details on the computer screen in such a way as to communicate what kind of Image or Detail is present in any particular text. The present method of the program uses a consistent coloring scheme to communicate the borders of the constituent element word patterns. These colors consistently communicate the type of context which the constituent elements symbolize. This specific color scheme is explained later in this paragraph. Just as the program categorizes English wording into one of these four patterns symbolized by colors, nothing that appears on the screen remains uncolored. If the present invention leaves any wording uncolored, that wording qualifies for inclusion in more than one pattern and thereby indicates to the user ambiguity in the writing. In Example 3 given later, the word "needs" can operate either as a verb in tense which would combine with the prior wording "and the expected increase . . . " to create a blue Primary image; or, the same wording "and the expected increase . . . " ties to a prior "both . . . " and therefore "needs" either requires "of" to be written before it or the writer neglected to complete the Image. Furthermore, depending on the location, these coloring schemes may overlap. Primary Images are colored blue; Conditional Images are colored pink; Background Details are colored orange; and Process Details are colored green. Thus, when looking at the coloring on the screen, the user is able to see which word patterns are occurring and in what orders.

The type of information communicated to a user by these colors is as follows. A blue Primary Image provides the skeleton of a sentence. A number of blue-colored patterns show equality of strength among the different Primary Images. Primary Images may serve as central or supporting points, however, but not necessarily as the only point.

Primary Images occasionally but only rarely Nest or Qualify, whereas they usually serve as a support structure for Nesting and compressing meaning. A dominance of Primary Images may signal being too happy or literal. In this case, for example, the user may not be showing enough shades of meaning.

For example, The system failed.

The present invention would color this group of words blue.

It should be noted, however, that different types of writing require different types of word patterns. Thus, to say that a dominance of Primary Images tends to make the text too choppy or literal, is purely subjective. In the method and device of the present invention, the user has complete control over the written product. Therefore, commenting on the strength or weakness of the user's text is not a function of the present invention. This invention does not espouse a particular, or universal, style nor suggest repudiation.

The color pink, indicating a Conditional Image, reveals shades of meaning. For example, Conditional Images communicate causes or time constraints. They show contingency. They expand or limit events. They create idea relationships, and dimensions of time and place; they provide supporting information of quantity, quality, rank, degree, cause, contrast, exclusion.

For example, Although the system failed, the default function prevented damage.

The present program would color "Although the system failed" pink.

A phrase colored green indicates a Process Detail which compacts or compresses ideas, or layers meaning. The user may thus decide to more explicitly identify agents or causes or sources of action. The use of too many Process Details, shown by an abundance of green on the screen, may indicate to the user that they are overemphasizing how something is done rather than who or what caused the events. On the other hand, the user may choose to compact multiple sentences into more economical wording with Process Details.

The system's failing triggered two defaults.

The present invention would color "the system's failing" green.

A phrase colored orange indicates Background Detail which helps the user make the text more specific. A drawback of the extended use of Background Detail is that the user may obscure the overall picture. On the other hand, the audience or substance of the text may demand details of time, place, and grouping.

The system failed in the budget department.

The present program would color "in the budget department" orange.

The present program parses natural languages. The identification and location of various word patterns allow the user to arrange them at will according to the meaning actually intended. This contrasts with previous systems which are organized around and rely upon individual word meanings so as to make the problem of natural language analysis lexical and not context-based. The program is context-based. That is, the program analyzes language at a higher structural level than prior object-based systems, and is consequently more effective. The present invention maximizes as opposed to limits meaning choices. As a secondary rather than a primary point of focus, the present invention also correctly, and perhaps more accurately than other systems, parses traditional parts of speech. An example of how accurately context-, rather than object-based analysis identifies multiple word uses is illustrated in the following sentence:

*Authors pen lines.*

This sentence contains three words, all of which a dictionary would list as verbs, nouns, and adjectives. Only the context-based arrangement accurately identifies which usage applies.

Those skilled in the art will understand that the various optional features of the method and device may be combined in any number of ways without departing from the scope of the present invention, and that this scope is to be limited only by the claims appended hereto.

EXAMPLE 1

Varied Applications for the Present Invention

The present invention utilizes the screen to demonstrate, by color, the context patterns and interrelationships among them in natural text. In conjunction with the screen display, a handbook accompanies the program to help the user choose options of thought in the wording of that text. To make the process easier, both the handbook and the help system include reminder descriptions of how each pattern operates. Users may use, e.g., a set of highlighter markers with the same abbreviated descriptions for reminders and reinforcement. These descriptions also have a use symbolically in conjunction with developing technology for voice activation, machine translation, natural language programming and artificial intelligence. Because the tool bar and the message lines in both the DOS and Windows versions utilized these abbreviations to direct the user, this example elucidates and repeats the same abbreviated definitions. The abbreviated descriptions include PI=A/D+M+(A/R), CI=CT+A/D+M+(A/R), PD=(to+)M(+ing)+(A/R)(+ed)(4), and BD=BT+A/R.

The abbreviated descriptions represent the following constituent elements word patterns:

Primary Image=Agent/Doer+Movement+(Agent/Receiver)

| | | |
|---|---|---|
| Conditional Image | = | Conditional Trigger + Agent/Doer + Movement + (Agent/Receiver) |
| Process Detail | = | to + movement + (Agent/Receiver) |
| | = | movement + ing + (Agent/Receiver) |
| | = | movement + ed or the irregular movement spellings symbolized by the number 4 for fourth column of verb-movement spelling |

Background Detail=Background Trigger+Agent/Receiver

Figure 5:
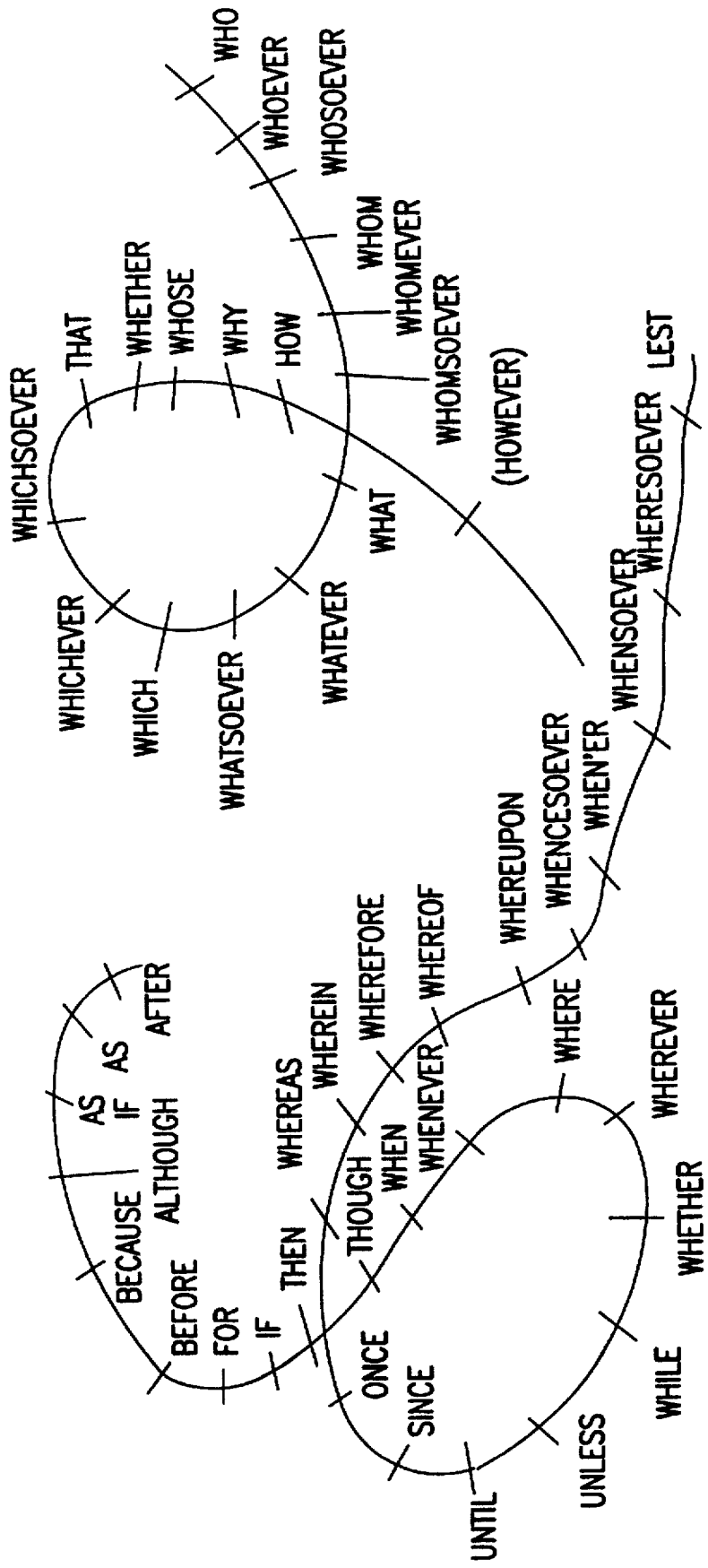
FIG. 5 is a diagram showing a type of data compression.

An example follows below for identifying any Conditional pattern. The Example, incidentally, may use a convenient data compression technique as indicated in FIG. 5 which allows the easy look-up of words. Within the industry of current computer technology, telecommunications and natural language processing, a need has arisen to efficiently symbolize bigger blocks of meaning than simply words. The transmission, for example, of voice synthesized communication via optic fiber requires compressing data into units or blocks of meaning which are as small or compact as possible. The constituent word patterns of the present program serve as such units. In other words, all Conditional Triggers, for example, could by symbolized with one type of computer code having symbolic variations to present all of the various Conditional Triggers.

EXAMPLE 2

The program runs on an IBM compatible system but may also run on many other platforms, e.g., Apple Macintosh and UNIX. 4 MB of RAM, or more, are recommended. There are approximately 50,000 lines of code, and 110 subprograms combined in the DOS version and 10,000 lines of code plus the zApp software in the windows version. The language is C; however, some of the code has been written in C++. The data files consist of a dictionary, approximately 750K, a translation file, 1K, and a configuration file. The dictionary contains no definitions, only syntactic information listing all the parts of speech a particular word can be. The translation file decodes the encrypted dictionary. The software in this example can highlight a 1000 sentence text corpus; however, as fully implemented, the software can handle any size document.

First, the software opens up a configuration file which tells certain hardware whether, for example, to spell check or not, to use black and white or color, and to write to the screen using fast video memory. Depending upon what the configuration file tells it, it sets color attributes that will be used. Then the user is prompted for a file name. The file is located, which fills up the display memory with that file; or the user may create a new file; or the user may input a file by any other means.

The user, at this point, has several options; for example, Alt+S will begin sentence analysis. The software parses one character at a time from the beginning until it locates the ending punctuation for sentences, including {?, !, .). It fills up the internal memory structures, identifies the beginning and end of each sentence relative to the display memory. It analyzes what kind of sentence each one is, i.e., whether it is simple, compound, complex, or compound-complex. Whichever sentence the cursor is on, is highlighted and centered on the screen.

The user may press W to identify each word's syntactic function. It parses one sentence at a time from the first character to the end and locates the end of word punctuation including {space, comma, semi-colon, quotation marks, or/and period). Then it fills another internal structure called word structure which contains the beginning and end of each word relative to display memory and contains information about the word type from the dictionary and the word's use, e.g., whether a noun is a subject noun or a receiver. As it locates each word, it checks the dictionary to find the first occurrence of the word in the dictionary, then stops when * finds a hit and marks the word with a syntactic part of speech label. Then it goes to the next word. After it identifies all the words in the sentence, it goes through a series of other tests to determine if there are any impossible situations if the words are marked as is. For example, if three words occur adjacently without any intervening commas or coordinating conjunctions that can all be nouns, when at least two of them cannot be nouns in that context, e.g. "Authors pen lines." In this case the computer would check the dictionary to see if the words in question could be any other part of speech and changes the syntactic label accordingly. The program makes approximately 50 scans per sentence. A sample listing of rules followed by the program is given in Appendix 6.

The user may opt to highlight Images in their appropriate colors. The user chooses "I". It parses the word structure from the first word to the end of the sentence, looking for Conditional Triggers and Equalizing and Joining Triggers.

It reads one word at a time, filling up a clause structure which contains the beginning and end of each clause in a sentence relative to the display memory and at the same time, the clause type, in both traditional terms and in the terms of the present program, i.e., whether the Images are Primary, Conditional, or Nested. It analyzes what kind of sentence each one is, i.e., whether it is simple, compound, complex, or compound-complex.

The user may also opt to highlight Details. The Detail logic is nearly the same as the clause logic in that the program searches for Detail Triggers as it scans the words from beginning to end, filling up the phrase structure relative to the display memory. Likewise, it identifies Detail type and highlights each Detail on the screen in the appropriate colors.

Of course, a user may opt to examine many sentences simultaneously to look for structure patterns. The user may select G for group mode and drag the cursor to the desired amount of text. The highlighting occurs identically to the sentence by sentence process except that it runs the logic repeatedly and displays colors for a body of text rather than just one sentence.

If a user opts to begin with Image mode or Phrase mode without first going into Word mode, the program automatically executes the word logic behind the scenes because the word logic is required for the Image and Detail logic. An embodiment of the word logic is demonstrated in Appendix 7.

EXAMPLE 3

Sentence variation for re-organizing thought serves as a central point for the user of the present program. Context patterns change their "weight" of substance by the simple additional change of Triggers and patterns. Without the color on the screen to illustrate these differences, the user may so struggle with the concepts that the present invention would be less than easily used. The color, therefore, provides real and substantive meaning beyond the labeling and parsing in the message lines. Furthermore, conventional grammatical labels focus primarily upon single-word use and part-of-speech designation with an incidental nod to group patterns which, although named, seem to have minor significance in the process of communicating. Contrarily, the group patterns, in fact, have more significance that the labels suggest because their interrelationships actually create an ordered meaning which the labels do not well explain. The following example illustrates the contribution that the color coding makes toward the understanding of natural text. The prior Detailed Description contains extensive examples of sentence variations for accessing multiple arrangements of meaning; therefore, those examples are not repeated herein in order to demonstrate the importance of the powerful information created in context and represented in the present invention by consistent color coding, but represented here with the following meaning.

Boldface type represents the "blue-colored" Primary Image.
Underlined text represents the "pink-colored" Conditional Image.
Italicized text represents the "green-colored" Process Detail.
Capitalized text represents the "orange-colored" Background Detail.

*Although [[wanting to know] [what you said]] tempted me*
pink    green    green    pink    pink
*to change [what I did] to you, I left.*
green    pink    orange    blue
Although [[wanting to know] [what you said]] tempted me
to change [what I did] TO YOU, I left.
[What you said] inspired me in spite of being what you called inattentive.
pink    blue    orange    green    pink
What you said inspired me IN SPITE OF [BEING [[WHAT YOU CALLED] INATTENTIVE]].

Appendix 1

EQUALIZING TRIGGERS

WORDS WHICH SIGNAL EQUAL RELATIONSHIPS

EQUALIZERS
(CONJUNCTIVE ADVERBS)
Equalizing Primary Images

List also includes:

| | | |
|---|---|---|
| also | accordingly | in addition |
| besides* | additionally | in any case |
| consequently | afterwards | indeed |
| furthermore | again | in fact |
| hence | anyhow | in like manner |
| however** | as a result | in short |
| likewise | at last | meanwhile |
| moreover | at the same time | namely |
| nevertheless | conversely | next |
| nonetheless | doubtless | on the contrary |
| otherwise | else | on the other hand |
| rather | eventually | perhaps |
| so | evidently | possibly |
| still | finally | primarily |
| then | for example | rarely |
| therefore | for instance | secondarily |
| thus | for this reason | sometimes |
| | (un)fortunately | that is |

PAIRING TRIGGERS
(COORDINATING CONJUNCTIONS)

Joining and Equalizing Single Words, Details (Phrases), or Images (Clauses)

| | |
|---|---|
| and | but* |
| or | yet |
| nor | |

Definitions: Words which literally have the quality of (-tive) joining together (-junc-) with (con-). They create idea relationships in sentences by joining images which remain equal in weight as though they had remained separate sentences. These equalizers create ideas of added, contrasted, or causal relationships, which we could not otherwise express. The pairing Triggers equalize words, phrases, or clauses.

Directions for this page:
Color the words themselves blue.
Color the single asterisks (*) and footnote orange.
Color the double asterisk (**) and footnote pink.
 *Background Trigger
 ** Conditional Trigger for "nounness"

46

Appendix 2

CONDITIONAL TRIGGERS

WORDS WHICH SIGNAL CONDITIONAL RELATIONSHIPS (SUBORDINATING CONJUNCTIONS)
Creating and Joining Conditional Images (Dependent Clauses)
Used Outside as Modifiers

| | | |
|---|---|---|
| after* | wherever | |
| as * | whether | |
| as if | while * | |
| although | unless * | |
| because | until * | |
| before* | since * | |
| for * | once | |
| if * | (Less often used than are the others): | |
| than | whereas | whencesoever |
| though | wherein | whene'er |
| when * | wherefore | whensoever |
| whenever | whereof | wheresoever |
| where* | whereupon | lest |

(RELATIVE PRONOUNS)
Creating and Joining Conditional Images (Dependent Clauses) Used Inside as Nouns
or Outside as Adjectives

| | |
|---|---|
| who | which |
| whoever | whichever |
| whosoever | whichsoever |
| whom | whether |
| whomever | that |
| whomsoever | whose |
| what | why |
| whatever | how |
| whatsoever | (however)** |

Definitions: Words which change the weight of an Image to a Conditional idea which propels the reader to see a connection with another idea. These words create a Conditional idea relationship showing the reason, time, place, or circumstance that events are true.

Directions for this page:
Color the words themselves pink.
Color the single asterisks (*) and footnote orange.
Color the double asterisk (**) and footnote blue.
    * Background Trigger
    ** Equalizer

Appendix 3

PROCESS DETAILS

| WORDS WHICH CHANGE VERBS TO NESTED OR ADDED PROCESSES |
|---|

(VERBALS AND VERBAL PHRASES)

Formula: to* + m  (+ A/R)  = to buy (a house)
                                           to mutter (a strange name)
                                           to contemplate
                                           to paint
                                           to be (flexible)

Formula: m + ing (+ A/R)  = walking (the dog)
                                           appearing (happy)
                                           thinking (good thoughts)
                                           swinging
                                           baking Formula: m + ed  = painted kitchen
(never has A/R)      completed thought
                                           finished project
                                           wasted moment
                                           gifted leader Formula: m + n/ng/d/t/k  = broken window
(never has A/R)                sung song
Also called irregulars (column 4     sold chair
pages 37-40)                       cut costs Definition: Words which create the notion of Process. They only function as agents ("nounness") or as modifiers (adjectives and adverbs). Very importantly, these forms of movement no longer operate as verbs, or movement, in Images. Process Detail Triggers and patterns consist only of spelling changes to verbs. These Triggers always operate consistently in the same way.

They always operate as expanded "nounness" in Blanks #1 and #3 or as qualifiers in Blanks #4, #5, and #6. They blend, compress, tie together, relate.

Directions for this page:
Color the formulae green.
Color the single asterisk (*) and footnote orange.
Color the double asterisks(**)and footnote blue.
        * Background Detail Trigger
        **Equalizer

Appendix 4

BACKGROUND TRIGGERS

WORDS WHICH SIGNAL BACKGROUND DETAIL

(PREPOSITIONS)

| | | | |
|---|---|---|---|
| about | concerning*** | nearing*** | to*** |
| above | considering*** | of | touching*** |
| across | despite | off | toward |
| after* | down | on | towards |
| against | during*** | onto | under |
| along | except | opposite | underneath |
| amid | excepting*** | out | unless* |
| among | excluding*** | outside | unlike |
| around | for* | over | until* |
| as* | forth | past | unto |
| at | from | pending*** | up |
| before* | if* | per | upon |
| behind | in | plus | versus |
| below | including*** | regarding*** | via |
| beneath | inside | respecting*** | wanting*** |
| beside | into | save | when* |
| besides** | like | saving*** | where* |
| between | mid | since* | while* |
| beyond | midst | throughout | with |
| but (meaning except)** | minus | thru | within |
| by | near | till* | without |

RARELY USED BACKGROUND TRIGGERS

| | | | | | |
|---|---|---|---|---|---|
| abaft | bating | forby | maugre | o'er | thoro |
| adown | ben | foreby | midst | oeuvres | thro' |
| afore | betwixt | fore | mongst | round | thwart |
| anent | chez | foment | nathless | sans | twist |
| anenst | circa | fornenst | neath | secundum | van |
| astride | de | forinst | next | sine | vice |
| athwart | ere | inby | nigh | sith | vis-a-vis |
| atween | ex | inbye | o | syne | von |

<u>Definition:</u> Words which create Background Detail. Background Detail contain data that the writer wants in Background, specifically of time, place, or grouping. The formula has two elements: the Trigger + Background data.
<u>Directions for this page:</u>
Color the words themselves orange.
Color the single asterisks (*) and footnote pink.
Color the double asterisks (**) and footnote blue.
Color the triple asterisks (***) and footnote green.

* Conditional Trigger
     ** Equalizer
    *** Process Detail

Appendix 5-A

Primary Image

Example:

Our present source of information for understanding and forecasting the ocean's structure, variability and dynamic interactions with the atmosphere is a loosely organized network of global satellite and conventional observations. This ocean network is a diverse composite of operational and research measurement systems and platforms operated by an equally varied group of responsible agencies, including NOAA, each with different missions and objectives. The measurements from this network serve often unrelated objectives that are dictated principally by the different missions of each operating agency and program. Consequently, the network is a costly, poorly coordinated mixture of observing systems with little commonality among them. Thus, we experienced the situation where some ocean regions have no observational coverage at all while other areas may have a significant amount of data being collected. Furthermore, incomparabilities in platform type and location, measuring instruments, data formats, quality control procedures and communication links, combined with inadequate operational data assimilation capability precludes full exploitation of the information that is available. This is a costly, inefficient, unacceptable situation for operational ocean forecasting. The problem is *[exacerbated]* by the inability to handle both the increasing volume of data from satellites (and real time automated conventional systems) and the expected increase in observations of all kinds needs to satisfy the requirements of fine resolution models for increased forecast accuracy.

> Boldface type represents the "blue-colored" Primary Image.
> Underlined text represents the "pink-colored" Conditional Image.
> Italicized text represents the "green-colored" Process Detail.
> Capitalized text represents the "orange-colored" Background Detail

Appendix 5-B

Conditional Image

Example:

Our present source of information for understanding and forecasting the ocean's structure, variability and dynamic interactions with the atmosphere is a loosely organized network of global satellite and conventional observations. This ocean network is a diverse composite of operational and research measurement systems and platforms operated by an equally varied group of responsible agencies, including NOAA, each with different missions and objectives. The measurements from this network serve often unrelated objectives that are [*dictated principally*] by the different missions of each operating agency and program. Consequently, the network is a costly, poorly coordinated mixture of observing systems with little commonality among them. Thus, we experienced the situation where some ocean regions have no observational coverage at all while other areas may have a significant amount of data being collected. Furthermore, incomparabilities in platform type and location, measuring instruments, data formats, quality control procedures and communication links, combined with inadequate operational data assimilation capability precludes full exploitation of the information that is available. This is a costly, inefficient, unacceptable situation for operational ocean forecasting. The problem is exacerbated by the inability to handle both the increasing volume of data from satellites (and real time automated conventional systems) and the expected increase in observations of all kinds needs to satisfy the requirements of fine resolution models for increased forecast accuracy.

Boldface type represents the "blue-colored" Primary Image.
    Underlined text represents the "pink-colored" Conditional Image.
    Italicized text represents the "green-colored" Process Detail.
    Capitalized text represents the "orange-colored" Background Detail Appendix 5-C Process Detail Example:

Our present source of information for *understanding and forecasting the ocean's structure, variability and dynamic interactions* with the atmosphere is a *loosely organized* network of global satellite and conventional observations. This ocean network is a diverse composite of operational and research measurement systems and platforms *operated* by *an equally varied* group of responsible agencies, including NOAA, each with different missions and objectives. The measurements from this network serve *often unrelated* objectives that are *dictated principally* by the different missions of each *operating* agency and program. Consequently, the network is a costly, *poorly coordinated* mixture of *observing* systems with little commonality among them. Thus, we experienced the situation where some ocean regions have no observational coverage at all while other areas may have a significant amount of data *being collected*. Furthermore, incomparabilities in platform type and location, *measuring* instruments, data formats, quality control procedures and communication links, *combined* with inadequate operational data assimilation capability precludes full exploitation of the information that is available. This is a costly, inefficient, unacceptable situation for *operational ocean forecasting*. The problem is *exacerbated* by the inability *to handle both the increasing volume* of data from satellites (and *real time automated conventional systems) and the expected increase* in observations of all kinds needs *to satisfy the requirements* of fine resolution models for increased forecast accuracy.

> Boldface type represents the "blue-colored" Primary Image.
> Underlined text represents the "pink-colored" Conditional Image.
> Italicized text represents the "green-colored" Process Detail.
> Capitalized text represents the "orange-colored" Background Detail Appendix 5-D    Background Detail Our present source OF INFORMATION FOR UNDERSTANDING AND FORECASTING THE OCEAN'S STRUCTURE, VARIABILITY AND DYNAMIC INTERACTIONS WITH THE ATMOSPHERE is a loosely organized network OF GLOBAL SATELLITE AND CONVENTIONAL OBSERVATIONS. This ocean network is a diverse composite OF OPERATIONAL AND RESEARCH MEASUREMENT SYSTEMS AND PLATFORMS operated BY AN EQUALLY VARIED GROUP OF RESPONSIBLE AGENCIES, INCLUDING NOAA, EACH WITH DIFFERENT MISSIONS AND OBJECTIVES. The measurements FROM THIS NETWORK serve often unrelated objectives that are dictated principally BY THE DIFFERENT MISSIONS OF EACH operating AGENCY AND PROGRAM. Consequently, the network is a costly, poorly coordinated mixture OF OBSERVING SYSTEMS WITH LITTLE COMMONALITY AMONG THEM. Thus, we experienced the situation where some ocean regions have no observational coverage AT ALL while other areas may have a significant amount OF DATA being collected. Furthermore, incomparabilities IN PLATFORM TYPE AND LOCATION, measuring INSTRUMENTS, DATA FORMATS, QUALITY CONTROL PROCEDURES AND COMMUNICATION LINKS, combined WITH INADEQUATE OPERATIONAL DATA ASSIMILATION CAPABILITY precludes full exploitation OF THE INFORMATION that is available. This is a costly, inefficient, unacceptable situation FOR OPERATIONAL OCEAN FORECASTING. The problem is exacerbated BY THE INABILITY to handle both the increasing volume OF DATA FROM SATELLITES (AND REAL TIME AUTOMATED CONVENTIONAL SYSTEMS) and the expected increase IN OBSERVATIONS OF ALL KINDS needs to satisfy the requirements OF FINE RESOLUTION MODELS FOR INCREASED FORECAST ACCURACY.

Boldface type represents the "blue-colored" Primary Image.
Underlined text represents the "pink-colored" Conditional Image.
Italicized text represents the "green-colored" Process Detail.
Capitalized text represents the "orange-colored" Background Detail Appendix 5-E    All Constituent Elements

Our present source OF INFORMATION FOR *UNDERSTANDING AND FORECASTING THE OCEAN'S STRUCTURE, VARIABILITY AND DYNAMIC INTERACTIONS* WITH THE ATMOSPHERE is a *loosely organized* network OF GLOBAL SATELLITE AND CONVENTIONAL OBSERVATIONS. This ocean network is a diverse composite OF OPERATIONAL AND RESEARCH MEASUREMENT SYSTEMS AND PLATFORMS *operated* BY AN *EQUALLY VARIED* GROUP OF RESPONSIBLE AGENCIES, INCLUDING NOAA, EACH WITH DIFFERENT MISSIONS AND OBJECTIVES. The measurements FROM THIS NETWORK serve *often unrelated* objectives that are dictated principally BY THE DIFFERENT MISSIONS OF EACH *operating* AGENCY AND PROGRAM. Consequently, the network is a costly, poorly coordinated mixture OF OBSERVING SYSTEMS WITH LITTLE COMMONALITY AMONG THEM. Thus, we experienced the situation where some ocean regions have no observational coverage AT ALL while other areas may have a significant amount OF DATA *being collected*. Furthermore, incomparabilities IN PLATFORM TYPE AND LOCATION, *measuring* INSTRUMENTS, DATA FORMATS, QUALITY CONTROL PROCEDURES AND COMMUNICATION LINKS, *combined* WITH INADEQUATE OPERATIONAL DATA ASSIMILATION CAPABILITY precludes full exploitation OF THE INFORMATION that is available. This is a costly, inefficient, unacceptable situation FOR *OPERATIONAL OCEAN FORECASTING*. The problem is *exacerbated* BY THE INABILITY *to handle both the increasing volume* OF DATA FROM SATELLITES (AND *REAL TIME AUTOMATED CONVENTIONAL SYSTEMS) and the expected increase* IN OBSERVATIONS OF ALL KINDS needs *to satisfy the requirements* OF FINE RESOLUTION MODELS FOR *INCREASED* FORECAST ACCURACY.

Boldface type represents the "blue-colored" Primary Image.
Underlined text represents the "pink-colored" Conditional Image.
Italicized text represents the "green-colored" Process Detail.
Capitalized text represents the "orange-colored" Background

Appendix 6

SAMPLE OF RULES IMPLEMENTED BY THE PROGRAM

Prepositions + nouns or + adjectives + nouns, ending with {and, or, nor, but, yet} + a noun, or + adjectives and noun, should highlight orange until the nearest noun following the {and, or, nor, but, yet}

"Very" is an adverb unless preceded by an article, and then it is a noun.

Verb tense delineates noun unit for clauses. Only verbs utilize tense; therefore, the single-word nouns, multiple single-word nouns, pronouns in the nominative case, indefinite pronouns, verbals (Process Details), or dependent clauses (Conditional Image) beginning with relative pronouns serve as noun units either preceding a verb in tense, following a verb in tense, or following a preposition (Background Trigger), or following a verbal (Process Detail) beginning with "to" or ending with "-ing.

Prepositional phrases (Background Detail) can end in the following ways: single nouns, article + a noun, an article + adjective + noun, an article + -ed verbal, an objective pronoun, an indefinite pronoun, a dependent clause (Conditional Image) beginning with a relative pronoun, an -ing verbal, an article + -ing, verbal + noun, an article + -ed verbal + noun, a "to" + verb verbal surrounded by quotation marks, quotation mark to + verb quotation mark + noun. Any of the above may occur in multiples if the last in the series is joined to the series by a coordinating conjunction. The ending of the prepositional phrase does not include an additional participle, adverb, adjective, or -ing verbal following the ending of the prepositional phrase because that participle, adjective, adverb, - ing verbal would modify the prior clause. If a noun which can be a verb which can be an adjective and ends in -s or is modified by an indefinite pronoun then both the indefinite pronoun and the noun-verb-adjective ending in -s is used as an adverb.

Prepositional phrases cannot contain a verb in tense unless that verb begins with a relative pronoun then that dependent clause is nested in the prepositional phrase as the receiver.

Nouns-verb words {like, near, down, except, out, over, plus, save, till, round, thwart} which can be used as prepositions.

The words {just, even, still} attached to subordinating conjunctions, prepositions, or interjections and then should be considered as a clustered part of the word to which they are attached.

When "very" precedes a noun, it is an adjective and is an adjective only in that position. If adjective, verb, adverb follows "very" then very is always an adverb.

A verb in tense will not be attached to another verb in tense in the same sentence without joiners. If an -s ending on a noun which can be a verb seems to be a verb in the present tense, that potential verb in tense must be preceded by a noun, nouns joined by coordinating conjunction, indefinite pronouns, the specific pronouns "he" "she", or "it", a verbal, or a dependent clause introduced by a relative pronoun and these prior words must also be also preceded by a joiner. For example, if we said "we went to the beach several times", "several times" cannot be a subject-verb or clause.

If a word which can operate as a noun follows a verb, it operates as an adverb. (He lies still). If a word which can operate as a noun precedes a verb, it operates as an adverb. (He still operates the still). This algorithm does not interrupt the logic that a noun following a linking verb becomes an adjective if it is also contained in the adjective list.

The nouns of time become adverbs following a verb or following a preposition, modifier, or verbal following a verb in tense. (Then, later, noon, sometimes, times, tomorrow, night, tonight, yesterday).

The noun follows a verb and stays a noun an article must occur between the verb in tense and the noun so that the noun cannot become an adverb. In other words: verb, adverb, noun which becomes adverb (He lies very still).

A word which can be a noun becomes an adverb if it occurs between a noun or a pronoun and a verb in tense (He still operates the still).

Words listed as adverbs usually follow verbs in tense or verbals; however, an occurrence of an adverb between a noun or pronoun and a verb in tense maintains the adverb label (He quickly goes/rapidly finishing).

An -ed or -ing verbal functions as a modifier-adjective if it follows immediately or immediately precedes a noun or pronoun. Otherwise it functions as a noun.

Any -ed or -ing verbal following a linking verb should be identified as a process detail verbal, not a verb in tense.

A verb or a noun which can be a preposition must follow a verbal, another prepositional phrase, a verb in tense, or a noun or pronoun except for the Possessive pronouns and relative pronouns and it must be followed by a noun, an objective case pronoun, an indefinite pronoun, a dependent clause introduced by a relative pronoun, an adjective or series of adjectives plus a noun or verbal, or article + adj + noun, or article + noun. (following down the road, she hesitated a lot) (Rolling like a mutt, the little kitten played alone)

In the case that this verb or noun which can be a preposition with the same ending, occurs before a clause it is also considered a preposition.

The list of verb helpers includes {do, did, should, would, can, could, may, must, might, ought}.

We will call these auxiliaries.

If "my" occurs next to a noun it becomes an adjective not an interjection.

If "so" is followed by a verb in tense, a past or present participle, an adjective or adverb, then "so" is an adverb.

After linking verbs the message screen will say "adjective/receiver" or "noun/receiver". In the case where a word can be a noun or an adjective after a linking verb, it changes to an adverb.

When a preposition such as {out, of, up, through, in, down} follows a verb without a noun, article, or an adjective + a noun following it, it's an adverb. (He built up the largest private library)

If a preposition is immediately followed by another preposition following a verb, the first preposition is an adverb.

The prepositional phrases which also serve as subordinating conjunctions are {after, as, before, for, if, when, while, nonetheless, until, 'till, where, till}.

whenever happy

If an -ed verbal is preceded by an article and followed by a noun, an adjective or adjectives + noun, an objective case pronoun, an indefinite pronoun it is an adjective.

A verb with irregular spellings will never confuse the past and the past participle for verbal use. Only the past participle can be used as a verbal. If an irregular past participle occurs following {have, has, had, will have, may have, might have, could have, would have, should have} it is part of the perfect tenses. The -ing spelling always operates as a verbal for all regular and irregular verbs. The past spelling can only be used as part of the past tense of a clause and the -s spelling always serves as a present tense verb preceded by a noun, a pronoun in the nominative case, an indefinite pronoun, a dependent clause introduced by a relative pronoun, a gerund, or an article + -ed participle.

If the infinitive spelling operates as a verb in tense it will be preceded by the same structures as those which precede the verb + -s spelling. If an infinitive spelling occurs without either "to" or one of the prior structures preceding it, it is operating as an infinitive with an unstated "to". Any infinitive form of a verb without a previous noun or a subject pronoun and without a stated "to" is a verbal infinitive.

For the sentence "I baked bread and baked bread is good" arranges the word order for two uses of -ed. Baked operates as a verb in tense if it is preceded by a noun unit, in this case, the personal pronoun, and if the verb in tense is followed by a noun, article + noun, article + adjective(s) + noun, adjective(s) + noun, objective case pronoun, a verbal or a dependent clause

A6 - 6 introduced by a relative pronoun. If the computer program assesses for the period at the end of the sentence by going to the left, the verb in tense, "is" will have to have a noun unit to make the unit a subject-verb and the preceding "-ed" verb "baked" will have to become a verbal participle. The prior coordinating conjunction identifies a required pairing or Equalizing of units, in this case, two independent clauses, or Primary Images, because each clause has a verb in tense requiring clause structure.

If the -ing + verb is preceded by an article and is followed by a noun, pronoun, or adjective(s), then it is a participle with the end of the phrase occurring at the next subject-verb, joiner, preposition, or dependent clause.

If the -ing is preceded by an article and is followed by an article, a noun, objective case pronoun, indefinite pronoun, an adjective(s), verbal, a dependant clause beginning with a relative pronoun, then it is a gerund, or noun unit with the ending occurring at the next verb in tense, joiner, preposition, adverb.

If the -ing is not preceded by an article, but nonetheless meets the prior conditions, then it is also a gerund or noun unit.

If an -ing spelling of a verb is followed by a verb in tense or an adverb +verb in tense then the -ing spelling is used as a noun unit (gerund).

A6 - 7

An -ing spelling of a verb also operates as a noun unit if it follows an article, a preposition, a preposition + article, or if the verb + -ing is followed by a noun, and article + noun, an article + adjective(s) + noun, objective case pronoun, indefinite pronoun.

An -ing verbal serves as a noun unit if it follows a linking or a transitive verb or verbal by itself or in the following combinations: article + -ing verbal, article + adjective(s) + -ing verbal, article + adverb + adjective + -ing verbal.

Otherwise, the verb + -ing verbal is an adjective.

Any irregular past participle which follows the verb to be should be listed as an adjective.

Any -ed verb spelling which follows a linking verb should be listed as an adjective.

Appendix 7

| SAMPLE PROCESSING LOGIC |
|---|

START WORD IDENTIFICATION LOGIC

START FIRST WORD IDENTIFICATION LOOP

1. If the 1st character of the word is not alpha and it is not a single or double quote, the word becomes a noun.

2. If the word has not been ID'd yet, check if it is a joiner. If it is, mark the word as a joiner.

3. If the word has not been ID'd yet, check if it is an article.

4. If the current word has not been ID'd yet, check if it is a verb. If it is, and we are not on the 1st word of the sentence, check to see if this verb should be "linked" to previous (e.g., "shall have" becomes a single word). The actual linking of the words does not occur until later in the logic.

5. If the current word has not been ID'd yet, or it is a joiner, check if it is a preposition. If it is found, make the primary or secondary word type a preposition depending upon whether the word was previously identified or not.

6. If we are not currently examining the first sentence word:

a. If the current word is an irregular or regular verb or a preposition and previous word usage and form are subject verb and past participle respectively, set the previous word to verbal.

b. If the current word is a subject verb and form is past participle and the previous word is in a table of past participle verbs, then set the current word to verbal.

7. If the word has not been ID'd yet, check for interjection.

8. If the word has not been ID'd yet, check for pronoun.

9. If the word has not been ID'd yet, check for adjective.

10. If the word has not been ID'd yet, check for adverb.

11. If the word has not been ID'd yet, check for noun.

12. If the current word is a noun, and the previous word usage and form are subject verb and past participle respectively, then set the previous word usage to verbal and turn off a flag indicating the current word is a subject verb.

13. If the current word usage is subject verb, set on a set on a flag indicating the current word is a subject verb.

14. If the current word is a joiner:

a. If the subject verb flag is off:

i. Change the current word to a non-joiner. A field containing a 'previous joiner' value is checked. This field points to a previous word in the sentence identified as a joiner. If there was a previous word marked as a joiner, it is set to a non-joiner.

b. If the subject verb flag is on:

i. Set the 'previous joiner' value to the current word, and set the subject verb flag off.

15. At this point, link verbs together if linking is needed.

16. There is logic outside of this main loop to identify quotations. If a word begins with a quote, all characters scanned become part of the quotation until a quote is encountered which is followed immediately by a space, comma, period, colon, semicolon, or null character.

END FIRST WORD IDENTIFICATION LOOP

17. If the variable pointing to a previous joiner is set and the subject verb flag is off, then set the previous joiner word to a non-joiner.

START SECOND WORD IDENTIFICATION LOOP
(The 'change noun to verb' flag is set off. All words are scanned from 1st to last.)

18. If the current word is a joiner, set the 'change verb to noun' flag off and loop immediately to get another word.

19. If the current verb is linking or transitive, turn on the flag and loop immediately to get another word.

20. If the current word is a regular verb and word is not a verbal and the 'change verb to noun' flag is on and the word is also a noun, then change the word to a noun.

21. If the current word is a regular or irregular verb and not linking, set the 'change verb to noun' flag off.

22. If the flag is on and current word is a noun and cannot be an adjective, set the 'change verb to noun' flag to off.

END SECOND WORD IDENTIFICATION LOOP

23. Scan thru all words. If the current word is a verb and can be a noun and the previous word is an adjective or article, change the verb to a noun.

24. Scan thru all words. If 2 back to back nouns are encountered, and the left one is also an adjective, change the left to an adjective.

25. Scan thru all words. If a word is an adjective, noun or verbal and the previous word is an interjection which can also be a pronoun, change the previous word to a pronoun.

26. Scan thru all words. If the current word is an adjective or noun and the previous word is a pronoun which can be adjective, change the previous word to an adjective.

27. Scan thru all words. If the current word is a verb that can be a noun and the previous word is a preposition (excluding 'To'), then change the current word from a verb to a noun.

28. Scan thru all words. If a word is marked as a subordinate conjunction and the word is in the list 'special prep' in TEXTGLOB.C, then if no subject verb follow the word before a joiner is met in the sentence, the word is changed from a subordinate conjunction to a preposition.

29. Scan thru all words for 2 back to a noun.

Case 2 - If a noun/pronoun occurs to the right of the 2 verbs and within the same clause, change the left verb to a noun. (For this operation, clause identification logic is called first if needed.)

END WORD IDENTIFICATION LOGIC

START CLAUSE IDENTIFICATION LOGIC

1. Scan thru all sentence words. if the current word is a joiner OR (the current word is in a list of special relative pronouns and the current word is not the last in the sentence and the next word is an adverb or a subject verb), then this triggers the end of the last clause and beginning of a new clause.

START CLAUSE TYPING LOOP (scan thru all clauses)

2. If the clause begins on the 1st word of the sentence and the clause begins with a relative pronoun of subordinate conjunction, the clause type is set to dependent.

3. If the clause begins on any word other than the 1st word AND (the 1st word of the clause is a relative pronoun or subordinate conjunction or the previous sentence word is a relative pronoun or subordinate conjunction), the clause is set to dependent.

END CLAUSE TYPING LOOP

4. Scan thru all dependent clauses looking for 2 subject verbs within the same clause (both verbs must be non-intransitive):

Case 1 - If there is a single noun/pronoun between the verbs the clause is split as follows: SV (split here) (words) Noun/Pronoun (words) SV Case 2 - 2 nouns/pronouns between the 2 subject verbs as follows: SV Noun/Pron (Split on 1st word after noun/Pronoun) Noun/Pronoun SV Note that if a new clause is created, it will be re-examined when it is encountered during the loop thru all clauses.

5. Next, steps 2 and 3 above are performed again with additional check after these two steps are performed:

a. Scan thru all dependent clauses:

i. If the clause does not begin on the 1st sentence word and the sentence word just before the clause starter is a relative pronoun or subordinate conjunction, we back up the clause start position to pick up the previous word.

6. Next determine sentence type based on count of independent clauses:

Case 1 - There are no independent clauses - set sentence type to zero (no type).

Case 2 - There is 1 independent clause and zero dependent. Set the type to simple sentence.

Case 3 - There is 1 independent clause and 1 or more dependent clauses. Set the type to complex sentence.

Case 4 - There are more than 1 independent clauses and zero dependent clauses. Set sentence type to compound.

Case 5 - There are more than 1 independent clauses and at least one dependent clauses. Set sentence type to compound-complex.

7. Scan thru all dependent clauses:

a. If the clause does not begin on the 1st sentence word and the word just prior to the clause starting word is in a list of special dependent clauses starter words ('just', 'even' and 'only'), then we move the clause starting back one word to include the special starter word.

END CLAUSE IDENTIFICATION LOGIC

Appendix 8

AUXILIARY VERBS

The auxiliaries operate in conjunction with verbs in tense without changing the tense meanings. They add possibility, or conjecture, but do not in any way alter the patterning of tense use.

may
might
can
could
would
should
do
did

What is claimed is:

1. A method for context-based parsing of natural language text, said method comprising the steps of:

receiving a stream of alphanumeric data representing a plurality of words delimited by a punctuation mark;

associating a semantic label with each of said plurality of words by using a look-up table to identify one or more potential semantic labels for a word, and selecting one of said potential semantic labels based on an order of said word within said plurality of words; and assigning each of said plurality of words to one of two binary context patterns based on said semantic label associated therewith and an order of said word with respect to one or more others of said plurality of words.

2. The method of claim 1, wherein each of said semantic labels is selected from a group consisting of a function of nounness, a function of verbness, and a qualifier.

3. The method of claim 2, wherein said two binary context patterns comprise an image context pattern and a detail context pattern.

4. The method of claim 3, wherein each of said two binary context patterns includes two binary context sub-patterns, respectively comprising a primary image context pattern, a conditional image context pattern, a process detail context pattern, and a background detail context pattern, said assignment step further comprising assigning each of said plurality of words to one of said binary context sub-patterns.

5. The method of claim 4, wherein said assignment step further comprises identifying a primary image upon detection of a word associated with a verbness semantic label in proximity to a word associated with a nounness semantic label.

6. The method of claim 1, wherein said assignment step further comprises searching said plurality of words for a predetermined trigger word associated with a binary context pattern.

7. The method of claim 6, wherein said predetermined trigger word is of a type selected from a group including a conditional trigger, a background trigger, an equalizing trigger, and a process detail trigger.

8. The method of claim 1, wherein said assignment step further comprises comparing a contiguous portion of said plurality of words and their associated semantic labels to a formula associated with a binary context pattern, said formula comprising a plurality of semantic labels in a predetermined order.

9. The method of claim 1, wherein said step of associating a semantic label with each of said plurality of words further comprises first identifying a potential verb in said plurality of words.

10. The method of claim 9, wherein said step of associating a semantic label with each of said plurality of words further comprises identifying a potential noun in said plurality of words.

11. The method of claim 10, wherein said step of associating a semantic label with each of said plurality of words further comprises identifying a potential modifier in said plurality of words.

12. The method of claim 1, wherein said assignment step further comprises searching said plurality of words for two or more contiguous words associated with a like semantic label.

13. A set of instructions stored on a medium for parsing a natural language text, said set of instructions comprising instructions for:

receiving a stream of alphanumeric data representing a plurality of words delimited by a punctuation mark;

associating a semantic label with each of said plurality of words by using a look-up table to identify one or more potential semantic labels for a word, and selecting one of said potential semantic labels based on an order of said word within said plurality of words; and assigning each of said plurality of words to one of two binary context patterns based on said semantic label associated therewith and an order of said word with respect to one or more others of said plurality of words.

14. The set of instructions of claim 13, wherein said instructions for assigning said plurality of words to a binary context pattern further comprise instructions for comparing a contiguous portion of said plurality of words and their associated semantic labels to a formula associated with a context pattern, said formula comprising a plurality of semantic labels in a predetermined order.

15. An apparatus for analyzing a natural language text including a plurality of words delimited by a punctuation mark, said apparatus comprising:

a processor;

a memory coupled to said processor, said memory including a look-up table with a plurality of entries, wherein each of said entries associates a semantic label with a word;

a text parser controlled to said processor and coupled to said memory, said text parser comprising a set of executable instructions for assigning a selected one of said plurality of words to a binary context pattern based on a semantic label associated with said selected word and an order of said selected word within said plurality of words.

16. The apparatus of claim 15, further comprising a text reformatter coupled to said text parser, said text reformatter comprising a set of executable instructions enabling a user to alter a meaning of said plurality of words by reordering said binary context patterns.

17. The apparatus of claim 16, further comprising a help system controlled by said processor, said help system including executable instructions for providing a user with guidance related to said text reformatter.

* * * * *

UNITED STATES PATENT AND TRADEMARK OFFICE
CERTIFICATE OF CORRECTION

PATENT NO. : 5,721,938
DATED : 24 February 1998
INVENTOR(S) : Barbara K. STUCKEY It is certified that error appears in the above-indentified patent and that said Letters Patent is hereby corrected as shown below:

| Column | Line | |
|---|---|---|
| 6 | 37 | Change "wind" to --wind--. |
| 6 | 38 | Change "wind" to --wind--. |
| 6 | 40 | Change "Clock" to --Clock--. |
| 6 | 52 | Change "still" to --still--. |
| 6 | 53 | Change "stills" to --stills--. |
| 6 | 54 | Change "still" to --still-- (four occurrences). |
| 6 | 55 | Change "still-life" to --still-life--. |
| 6 | 61 | Change "'Twas" to --'Twas--; change "and the" to --and the--. |
| 6 | 62 | Change "in the" to --in the--. |

UNITED STATES PATENT AND TRADEMARK OFFICE
CERTIFICATE OF CORRECTION

PATENT NO. : 5,721,938  
DATED : 24 February 1998  
INVENTOR(S) : Barbara K. STUCKEY Page 2 of 4

It is certified that error appears in the above-indentified patent and that said Letters Patent is hereby corrected as shown below:

| Column | Line | |
|---|---|---|
| 6 | 63 | Change "All" to --All--; change "were the" to --were the--. |
| 6 | 64 | Change "And the" to --And the--. |
| 9 | 6 | Change "Process Detail To fail" to --Process Detail To fail-- |
| 9 | 8 | Change "failed" to --failed--. |
| 9 | 10 | Change "failing" to --failing--. |
| 9 | 12 | Change "Background Detail: in the budget department" to --Background Detail: in the budget department--. |
| 12 | 27 | Change "the system failed" to --The *system failed*--. |
| 12 | 28 | Change "Although the system failed ..." to --*Although the system failed ...*--. |
| 13 | 36 | Change "What she said" to --What she said--. |

UNITED STATES PATENT AND TRADEMARK OFFICE
CERTIFICATE OF CORRECTION

PATENT NO. : 5,721,938

DATED : 24 February 1998

INVENTOR(S) : Barbara K. STUCKEY

It is certified that error appears in the above-indentified patent and that said Letters Patent is hereby corrected as shown below:

| Column | Line | |
|---|---|---|
| 13 | 37 | Change "what she said" to --what she said--. |
| 13 | 38 | Change "what she said" to --what she said--. |
| 13 | 40 | Change "what she said" to --what she said--. |
| 13 | 42 | Change "what she said" to --what she said--. |
| 13 | 46 | Change "Saying that" to --Saying that--. |
| 13 | 50 | Change "saying that" to --saying that--. |
| 13 | 50 | Change "saying that" to --saying that--. |
| 13 | 52 | Change "saying that" to --saying that--. |
| 13 | 56 | Change "commitment" to --commitment--. |
| 13 | 57 | Change "com-" to --com---. |
| 13 | 58 | Change "mitment" to --mitment--. |
| 13 | 59 | Change "commitment" to --commitment--. |

UNITED STATES PATENT AND TRADEMARK OFFICE
CERTIFICATE OF CORRECTION

PATENT NO. : 5,721,938
DATED : 24 February 1998
INVENTOR(S) : Barbara K. STUCKEY It is certified that error appears in the above-indentified patent and that said Letters Patent is hereby corrected as shown below:

Column      Line

16 Replace 36-47:

>Primary Image=Agent/Doer+Movement+(Agent/Receiver)
>
>Conditional Image = Conditional Trigger + Agent/Doer + Movement + (Agent/Receiver)
>Process Detail = to + movement + (Agent/Receiver)
> = movement + ing + (Agent/Receiver)
> = movement + ed or the irregular movement spellings symbolized by the number 4 for fourth column of verb-movement spelling
>
>Background Detail=Background Trigger+Agent/Receiver 66      38      Change "controlled to" to --controlled by--.

Signed and Sealed this

Eleventh Day of August 1998

Attest:

BRUCE LEHMAN

*Attesting Officer*      *Commissioner of Patents and Trademarks*